No. 735,084. Patented August 4, 1903.

UNITED STATES PATENT OFFICE.

ALBERT M. FULLER, OF ST. PAUL, MINNESOTA.

PASTE.

SPECIFICATION forming part of Letters Patent No. 735,084, dated August 4, 1903.

Application filed November 27, 1896. Serial No. 613,657. (No specimens.)

*To all whom it may concern:*

Be it known that I, ALBERT M. FULLER, of St. Paul, Ramsey county, Minnesota, have invented certain Improvements in Pastes, of which the following is a specification.

My invention relates to improvements in dry flour paste.

The object of my invention is to provide a dry powdered paste which will absorb a larger proportionate quantity of water than the compounds heretofore used, thus making a wet paste of equal consistency by mixing with the water a smaller proportion of dry paste, and thereby effecting a considerable saving in the amount of material used. To obtain this result, I use with flour or equivalent material borax or other soluble salt of boric acid. I prefer to use borax because it is most convenient; but any combination of ingredients which by chemical reaction would produce a soluble borate could be used—for example, sodium hydrate or carbonate with boric acid.

In manufacturing my invention I preferably mix the flour with a solution of borax in water, which mixture is then cooked, dried, and ground to a fine powder. When used as an adhesive, this powder is mixed with cold water to the desired consistency and used in the same way as ordinary wet paste.

The dry paste made in accordance with my invention consists generally of one hundred parts of flour and from one to ten parts of borax, the preferred proportions being flour, ninety-eight parts, and borax, two parts.

In making the dry paste I prefer to use a quantity of water about equal to the weight of the flour; but this is largely a matter of convenience in manufacture.

In cooking the material I prefer to heat it in a suitable receptacle until the temperature of the mass is from 175° to 190° Fahrenheit.

By the term "flour" I mean either the common flour of commerce or an equivalent starchy material in which the original structure of the starch granules has not been changed by roasting or other process.

I claim—

1. A dry paste consisting of a cooked mixture of flour, and a suitable borate substantially as specified.

2. A dry paste consisting of the powder produced by grinding the dry residue obtained on evaporating the water from a cooked mass composed of water, flour and borax substantially as described.

3. A dry paste consisting of a cooked mixture of flour, and borax in the proportion of one hundred parts of flour and one to ten parts of borax.

In testimony whereof I affix my signature in presence of two witnesses.

ALBERT M. FULLER.

Witnesses:
 MINNIE L. THAUWALD,
 T. D. MERWIN.